Aug. 11, 1925.
V. HEJMA
1,549,542
AGRICULTURAL APPLIANCE
Filed July 19, 1923
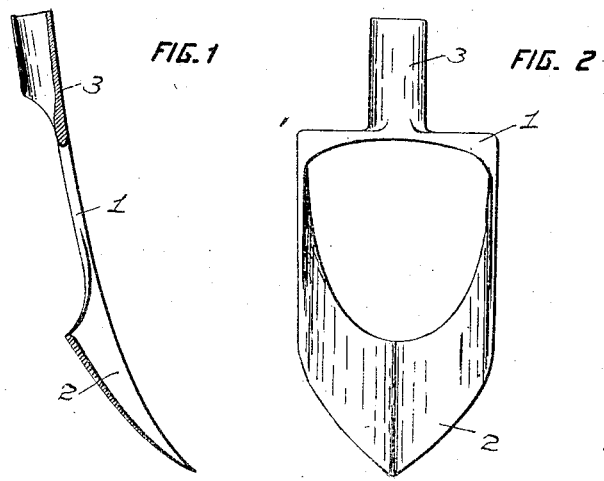
Inventor
Václav Hejma
By Attorney Patented Aug. 11, 1925.

1,549,542

UNITED STATES PATENT OFFICE.

VÁCLAV HEJMA, OF BRNO, CZECHOSLOVAKIA.

AGRICULTURAL APPLIANCE.

Application filed July 19, 1923. Serial No. 652,613.

*To all whom it may concern:*

Be it known that I, VÁCLAV HEJMA, a citizen of Czechoslovakia, residing at Brno, Czechoslovakia, have invented certain new and useful Improvements in Agricultural Appliances, of which the following is a specification.

The present invention relates to a hand spade the special formation of which has for its object to enable the earth dug up when lifting it to be turned over on the same spot without having, as heretofore usual, to turn the spade over at the same time, whereby work is substantially facilitated and accelerated. The spade according to the present invention is essentially constructed in such a manner that its upper part is broken through and forms a frame which, at its lower part, passes over into a roof-shaped spade blade.

The spade according to the invention is shown in the drawings, Figures 1 and 2 being a longitudinal section and a front elevation thereof respectively.

As will be seen from the drawing, the upper part of the spade below the handle socket 3 is broken through so as to form a frame 1 which, at its lower part, terminates in the digging blade 2. This blade 2 has a pointed digging edge and its body portion is hollowed out in a substantial V-shaped manner. After being pushed into the earth the spade is lifted out in the usual way and the earth, on being raised up, falls through the broken away part 1, is turned over and falls down on the same spot. The earth which lies upon the blade portion 2 will, when the spade is lifted, roll along the V-shaped gutter or channel of said blade and out through the broken away part 1. Hence it is unnecessary to turn over the spade together with the earth upon it.

What I claim and desire to secure by Letters Patent of the United States is:

1. A hand spade comprising a blade having a digging part which is substantially V-shaped in transverse cross-section and having a single hole symmetrically disposed above said digging part thereof to permit the earth dug to fall through said hole in the same place without the necessity for turning over the spade, and a handle secured to said blade above said hole.

2. A hand spade comprising a blade having a digging part which is substantially V-shaped in transverse cross-section and having a single hole symmetrically disposed above said digging part to permit the earth dug to fall through said hole in the same place without the necessity for turning over the spade, and a handle secured above said hole, the upper part of the blade being in the form of a frame.

In testimony whereof I affix my signature.

DR. VÁCLAV HEJMA.